United States Patent
Gautney

(10) Patent No.: US 7,086,051 B2
(45) Date of Patent: Aug. 1, 2006

(54) METHOD AND APPARATUS FOR JUST-IN-TIME PROVISIONING APPLICATION-RELATED INFORMATION AT A COMMUNICATION DEVICE

(75) Inventor: Charles W Gautney, Germantown, MD (US)

(73) Assignee: Defywire, Inc., Reston, VA (US)

( * ) Notice: Subject to any disclaimer, the term of this patent is extended or adjusted under 35 U.S.C. 154(b) by 0 days.

(21) Appl. No.: 10/224,476

(22) Filed: Aug. 21, 2002

(65) Prior Publication Data

US 2004/0040022 A1 Feb. 26, 2004

(51) Int. Cl.
G06F 9/445 (2006.01)
G06F 9/44 (2006.01)
H04M 3/00 (2006.01)

(52) U.S. Cl. .................. 717/176; 717/171; 455/419

(58) Field of Classification Search ........ 717/168–178; 709/219, 224; 713/2; 455/419; 707/203; 71/171
See application file for complete search history.

(56) References Cited

U.S. PATENT DOCUMENTS

| 5,754,864 | A | * | 5/1998 | Hill ............................ 717/173 |
| 5,761,504 | A | * | 6/1998 | Corrigan et al. ............... 713/2 |
| 5,813,015 | A |   | 9/1998 | Pascoe |
| 5,835,724 | A |   | 11/1998 | Smith |
| 6,016,311 | A |   | 1/2000 | Gilbert et al. |
| 6,032,227 | A |   | 2/2000 | Shaheen et al. |
| 6,065,120 | A |   | 5/2000 | Laursen et al. |
| 6,148,405 | A |   | 11/2000 | Liao et al. |
| 6,178,448 | B1 | * | 1/2001 | Gray et al. ................. 709/224 |
| 6,233,608 | B1 |   | 5/2001 | Laursen et al. |
| 6,427,227 | B1 | * | 7/2002 | Chamberlain ............... 717/124 |
| 6,456,603 | B1 |   | 9/2002 | Ismailov et al. |
| 6,460,076 | B1 | * | 10/2002 | Srinivasan .................. 709/219 |
| 6,480,957 | B1 |   | 11/2002 | Liao et al. |
| 6,484,174 | B1 |   | 11/2002 | Wall et al. |
| 6,490,616 | B1 |   | 12/2002 | Maryka et al. |
| 6,490,624 | B1 |   | 12/2002 | Sampson et al. |
| 6,532,225 | B1 |   | 3/2003 | Chang et al. |
| 6,574,239 | B1 |   | 6/2003 | Dowling et al. |
| 6,650,905 | B1 |   | 11/2003 | Toskala et al. |
| 6,654,610 | B1 |   | 11/2003 | Chen et al. |
| 2001/0006517 | A1 |   | 7/2001 | Lin et al. |
| 2001/0052052 | A1 |   | 12/2001 | Peng |
| 2002/0062361 | A1 | * | 5/2002 | Kivipuro et al. ............. 709/219 |
| 2002/0065083 | A1 |   | 5/2002 | Patel |
| 2002/0083160 | A1 |   | 6/2002 | Middleton |
| 2002/0123336 | A1 |   | 9/2002 | Kamada |
| 2003/0005427 | A1 | * | 1/2003 | Herrero ....................... 717/178 |
| 2003/0032417 | A1 | * | 2/2003 | Minear et al. .............. 455/419 |
| 2003/0061273 | A1 |   | 3/2003 | Hayduk |
| 2003/0110190 | A1 | * | 6/2003 | Achiwa et al. ............. 707/203 |
| 2003/0159136 | A1 |   | 8/2003 | Huang et al. |
| 2003/0217358 | A1 | * | 11/2003 | Thurston et al. ............ 717/174 |
| 2003/0225797 | A1 |   | 12/2003 | Shields et al. |
| 2004/0158829 | A1 |   | 8/2004 | Beresin et al. |

* cited by examiner

*Primary Examiner*—Antony Nguyen-Ba
(74) *Attorney, Agent, or Firm*—Cooley Godward LLP

(57) ABSTRACT

Software applications are provisioned at a communication device having its own memory device. A download request based on an application-related request is sent if application-related information associated with the application-related request is not stored on the memory device of the communication device. A portion of the application-related information is received based on the download request. The portion of the application-related information is stored when the portion of the application-related information is configured for storage.

33 Claims, 6 Drawing Sheets

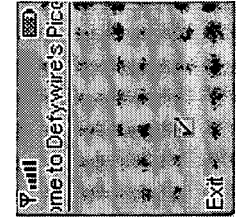
FIG. 7
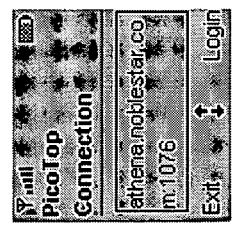
FIG. 6
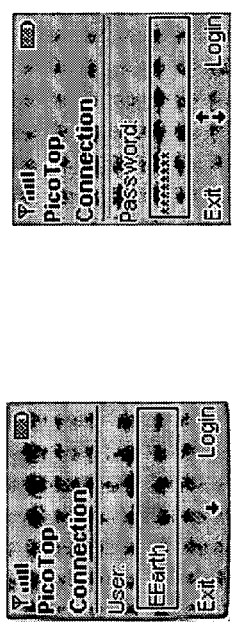
FIG. 5
FIG. 4
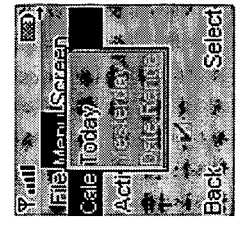
FIG. 12
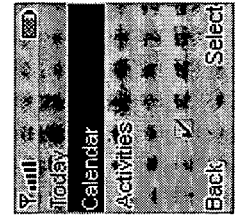
FIG. 11
FIG. 10
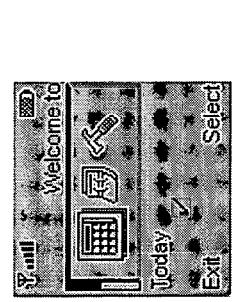
FIG. 9
FIG. 8

METHOD AND APPARATUS FOR JUST-IN-TIME PROVISIONING APPLICATION-RELATED INFORMATION AT A COMMUNICATION DEVICE

CROSS-REFERENCE TO RELATED APPLICATIONS

This application is related to co-pending U.S. patent application Ser. No. 10/224,331, entitled "Method and Apparatus for Establishing Multiple Bandwidth-Limited Connections for a Communication Device;" and U.S. patent application Ser. No. 10/224,486, entitled "Method and Apparatus for Managing Resources Stored on a Communication Device;" all filed on the same day, the disclosures of which are incorporated herein by reference.

BACKGROUND

The invention relates generally to communication devices and communication systems. More specifically, the invention relates to a system and method for just-in-time provisioning application-related information at a communication device.

Communication devices, such as for example wireless phones, are increasingly incorporating additional software functionality beyond that needed to establish a communication connection. For example, communication devices can include software applications such as calendars, contact lists, calculators, etc. Moreover, additional applications based on, for example, Java™ languages such as Java™2 Micro Edition (J2ME) are being developed for use with communication devices. These software applications also typically involve a sizable amount of application data. For example, a software application that provides the functionality of a contact list also uses application data relating to the contact's name, phone number, etc.

These communication devices, however, typically have storage devices with a limited storage capacity. Accordingly, the limited storage capacity of typical communication devices often limits the number of applications and the amount of application-related information that can be stored on a communication device at any given time.

One known way to accommodate a large number of software applications and their related data is to provision applications as needed and to remove the applications when not needed. Such known provisioning is performed by installing and/or removing an entire application and all of its related data. For example, as an application is needed, an unused application and all of its related data are first deleted from the communication device to make room for the provisioning of the new application and its related data.

This known way of provisioning applications to communication devices, however, suffers shortcomings. For example, removing an entire application and its related data may free more memory space than is actually needed to provision the new application. This can involve more time than would otherwise be involved to free only the amount of memory needed. In addition, removing an entire application and its related data also removes an indication to the user that that application and its related data may be available again in the future. Moreover, requiring user-initiated actions to select and/or remove applications overburdens the users and unnecessarily complicates the operation of communication devices.

Thus, a need exists for a more effective form of provisioning software applications and their related data for communication devices.

SUMMARY OF THE INVENTION

Software applications are provisioned at a communication device having its own memory device. A download request based on an application-related request is sent if application-related information associated with the application-related request is not stored on the memory device of the communication device. A portion of the application-related information is received based on the download request. The portion of the application-related information is stored when the portion of the application-related information is configured for storage.

BRIEF DESCRIPTION OF THE DRAWINGS

FIGS. 4 through 6 show an example of the display of a user interface at a communication device relating to the establishing a connection between the communication device and a gateway, according to an embodiment of the invention.

FIG. 7 shows an example of a display of a user interface of a communication device where no applications are provisioned for the communication device, according to an embodiment of the invention.

FIG. 8 shows an example of a user interface of a communication device where two application indicators are displayed, according to an embodiment of the invention.

FIGS. 9 and 10 show an example of a user interface of a communication device where a subset of five application indicators is displayed, according to an embodiment of the invention.

FIGS. 11 and 12 show examples of a user interface of a communication device after application components have been received and provisioned, according to an embodiment of the invention.

DETAILED DESCRIPTION

Figure 1:
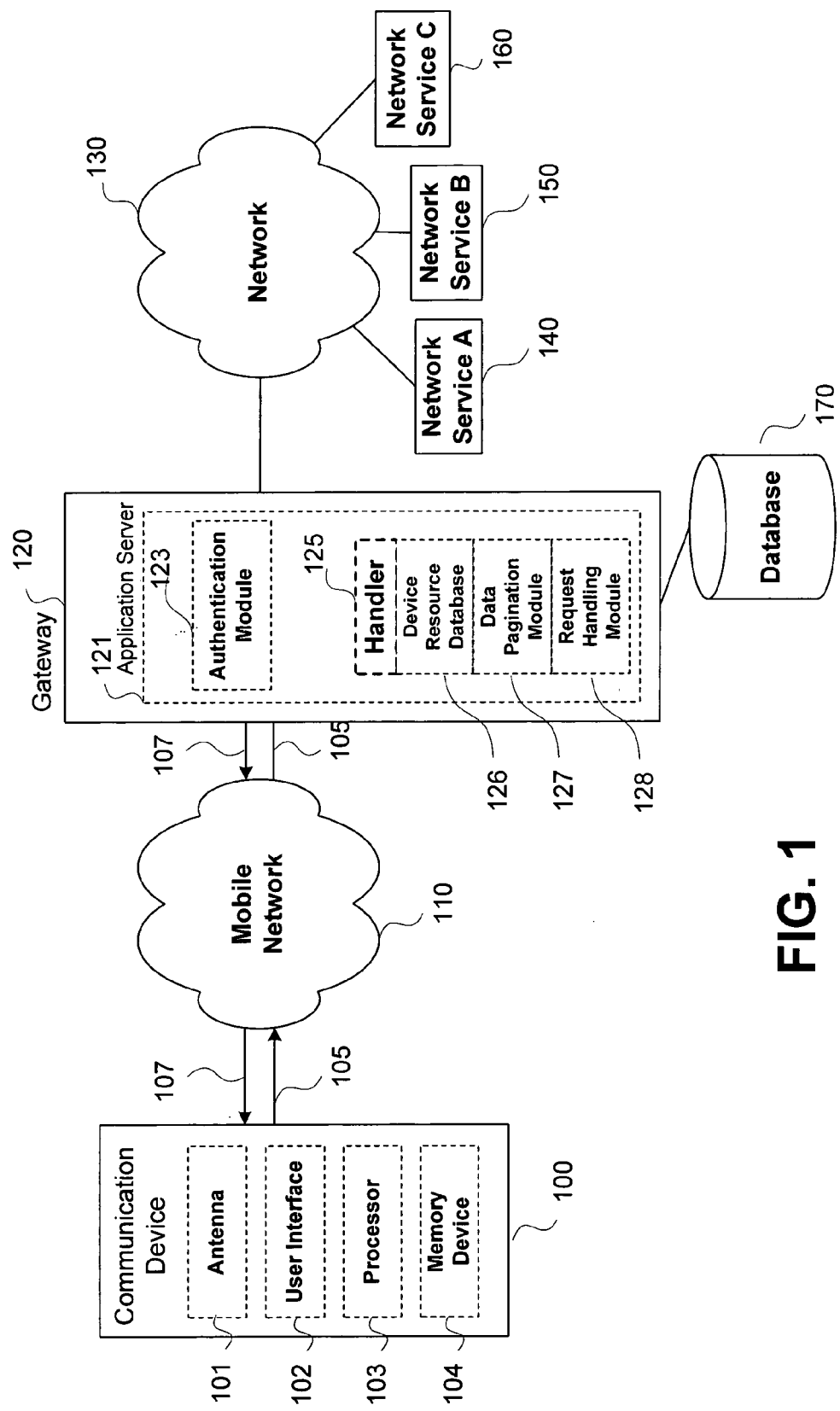
FIG. 1 shows a system block diagram of a communication network according to an embodiment of the invention.

Just-in-time provisioning of software applications at a communication device is performed. The provisioning is "just-in-time" in the sense that applications, application components and/or application data can be provided to the communication device as needed rather than maintaining all of this application-related information within the memory device of the communication device. These applications, application components and/or application data can be provided to the communication device as a whole or in portions. For example, separate portions of an application can be provisioned when the application can be paginated into distinctly downloadable portions. The term "pagination" is used herein to mean the division or segmentation of an application or application-related data into discrete portions.

When an application is paginated, the resulting segments are referred to herein as application components.

Consequently, rather than deleting an entire application, application portions can be added and removed as the available amount of memory changes while at the same time allowing at least an indication of the application to be provided to the user. This advantageously allows the removal of just enough application portions to free up whatever amount of memory space is needed to perform other functions (e.g., execute other applications). In addition, this advantageously maintains an indication to the user that the application can be available in the future even though the entire application may be not presently provisioned.

As a need for provisioning application-related information arises, a download request based on an application-related request can be sent to, for example, a gateway through which application-related information can be routed. The term "download request" is used to mean any type of request or instruction sent from the communication device to request application-related information from the network. For example, a download request can be a request sent from the communication device to the gateway requesting that application-related information be provided to the communication device through the gateway. The term "application-related information" is used to include information related to an application operable on the communication device. Such application-related information can include, for example, applications, application components or data used by an application.

A user can send an application-related request to trigger provisioning of application-related information. The term "application-related request" is used herein to mean any type of request by a user that results in the provisioning of application-related information that is not presently available in the memory device of the communication device. For example, the user can use a keypad of a user interface to request that a particular function be performed at the communication device, such as accessing a calendar. In such a case, if the calendar information sought is not stored on the memory device of the communication device, then a download request can be formed by the communication device based on the application-related request.

Application-related information can be used in the execution of an application as soon as the application-related information is received. In some situations, the received application-related information can be stored at the communication device while, in other situations, the received application-related information need not be stored at the communication device. For example, when the received application-related information is a screen command application component, the screen command can be used for the immediate display of information at the user interface of the communication device and the screen command need not be stored on the communication device. Alternatively, when the received application-related information is a definition command application component, the definition command can be stored to the memory device of the communication device for execution by the application.

The application-related information can be associated with a connected application or a disconnected application. A connected application can receive the application-related information and use that information while communication device 100 maintains a connection with gateway 120. A disconnected application can receive the application-related information and use that information after the connection between the communication device 100 and the gateway 120 has been disconnected.

The communication device can send requests and receive information, for example, over a bandwidth-limited connection. The term "bandwidth-limited connection" is used to include any type of connection where the bandwidth of the information desired to be transmitted exceeds the available bandwidth capacity of the connection. Such a bandwidth-limited connection can include, for example, a wireless data connection configured to send and/or receive multimedia content.

FIG. 1 shows a system block diagram of a communication network according to an embodiment of the invention. Communication device 100 is coupled to gateway 120 through mobile network 110 by an uplink connection 105 and a downlink connection 107. Gateway 120 is coupled to network 130 and database 170. Network 130 is coupled to network service A 140, network service B 150 and network service C 160. Network services A 140, B 150 and C 160 can be any type of information stored at a network device that is remotely accessible. Such network services can be, for example, web-based multimedia content or a non-web-based software application.

Communication device 100 includes antenna 101, user interface 102, processor 103 and memory device 104. Gateway 120 includes application server 121, which includes authentication module 123 and handler 125. Handler 125 further includes device resource database 126, data pagination module 127 and request handling module 128. Application server 121 includes software configured to allow the functionality discussed below, including the functionality relating to the authentication module 123 and handler 125. Similarly, the memory device 104 of communication device 100 stores client-side software that is configured to operate with the software of application server 121. Note that although the software is described in terms of client and server software, any appropriate software configuration, such as distributed software, is possible.

The uplink connection 105 and downlink connection 107 are established for a particular communication device 100 for the duration of a session. In other words, once the communication device 100 is connected to the mobile network 110 via the uplink connection 105 and downlink connection 107, the session information associated with those connections is maintained during the duration of the session regardless of the particular status of the connections. Additional details of the uplink connection 105 and the downlink connection 107 are provided in co-pending U.S. patent application Ser. No. 10/224,331, entitled "Method and Apparatus for Establishing Multiple Bandwidth-Limited Connections for a Communication Device."

Figure 2:
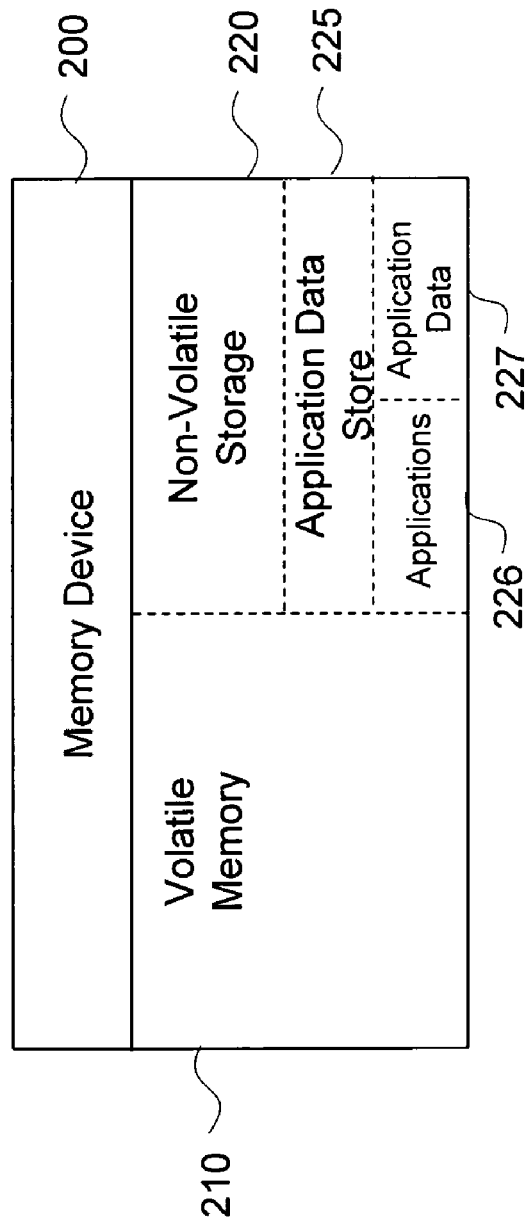
FIG. 2 shows a diagram of an example of a memory device of a communication device, according to an embodiment of the invention.

FIG. 2 shows a diagram of an example of a memory device of a communication device, according to an embodiment of the invention. More specifically, FIG. 2 shows an example of the memory device 104 of communication device 100 shown in FIG. 1. Memory device 200 includes a volatile memory 210 and a non-volatile storage 220. Non-volatile storage 220 further includes a memory portion where application data store 225 is stored. The application data store 225 can store application-related information such as applications 226 and application data 227.

Because application-related information provided to communication device 100 is stored in application data store 225 of non-volatile memory 220, the corresponding applications can be implemented on communication device 100 having its own device-specific software stored in the non-volatile storage 220. Thus, customized applications can be provisioned and executed on communication device 100 in a manner compatible with the pre-existing software associated with communication device 100.

Although the memory device 200 is shown in FIG. 2 as having a volatile memory 210 and a non-volatile storage 220, other configurations are possible. For example, a memory device can include solely volatile memory or solely non-volatile storage. In either configuration, the application-related information can be stored in an appropriate portion of the memory device. Similarly, although embodiments discussed herein refer to storing particular types of information in either the volatile memory or the non-volatile storage, alternative embodiments are possible where the same type of information is stored in different areas of the memory device. Memory device 200 can be, for example, a pluggable memory module such as the Sony Memory Stick™ or a CompactFlash (CF) card.

Figure 3A:
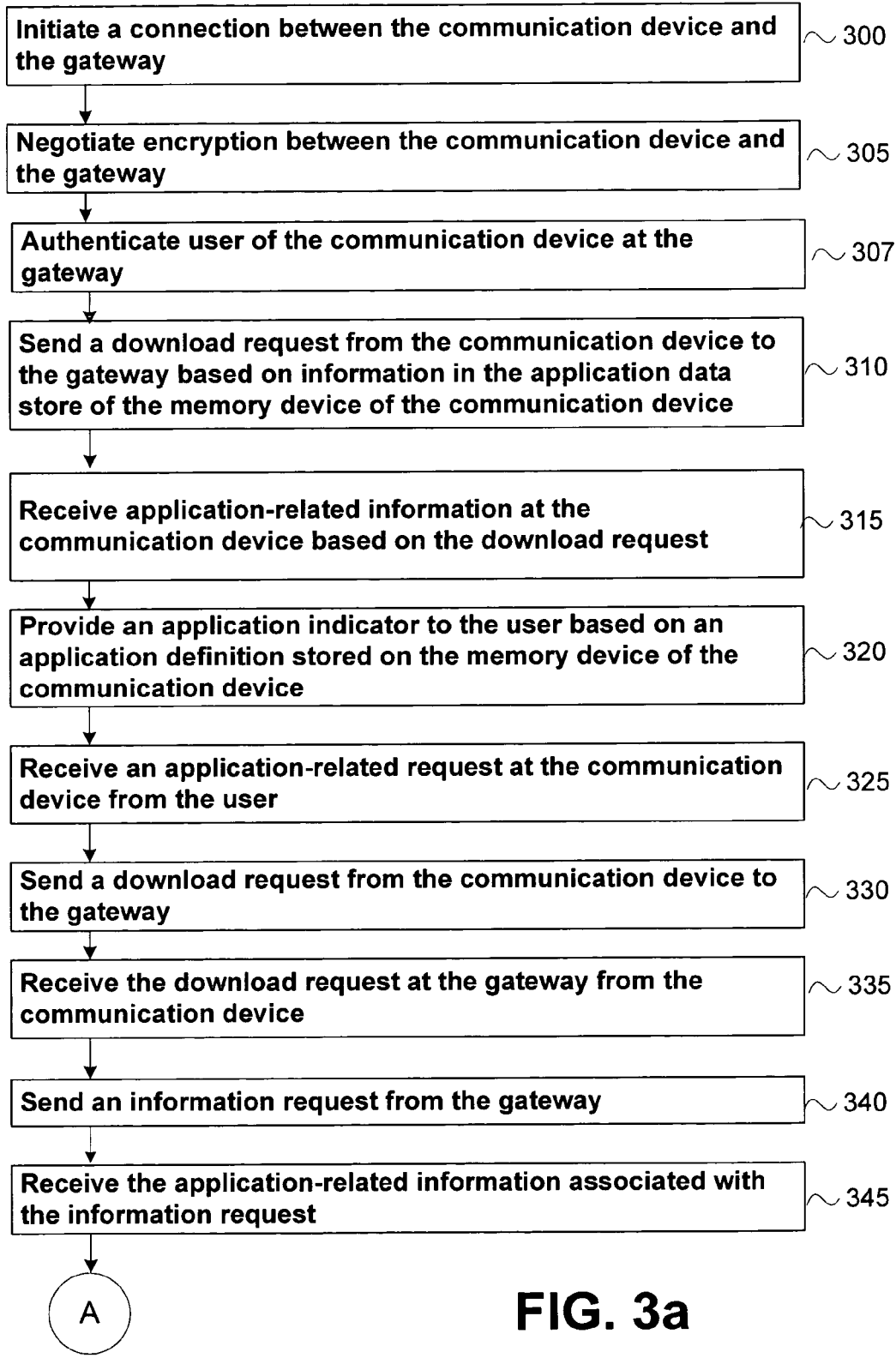
FIGS. 3a and 3b shows a flowchart for performing provisioning, according to an embodiment of the invention.
Figure 3B:
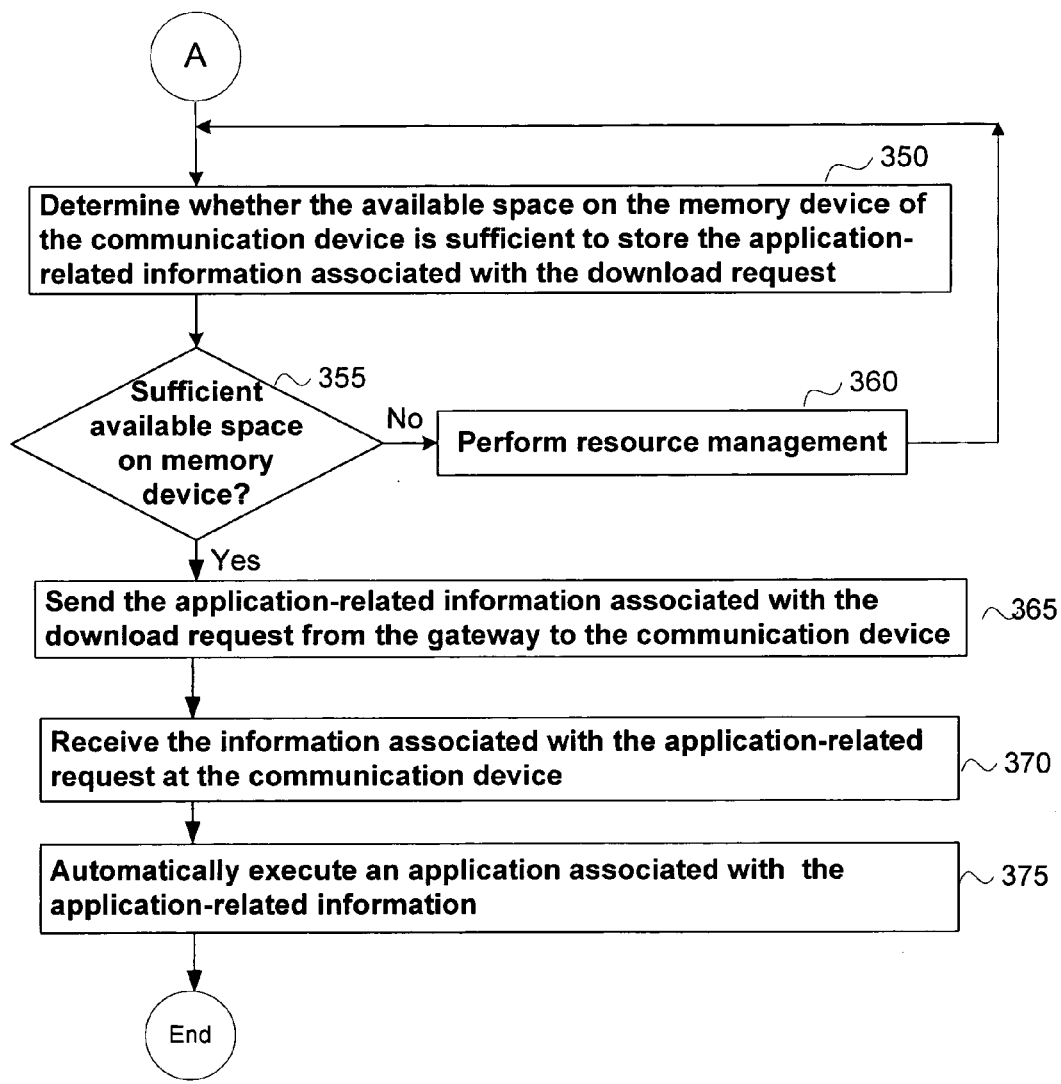

FIGS. 3a and 3b show a flowchart for performing provisioning, according to an embodiment of the invention. Although FIGS. 3a and 3b are described below in reference to the communication system of FIG. 1, the process of FIGS. 3a and 3b can be applied to alternative configurations of communication systems.

As step 300, a connection between the communication device 100 and the gateway 120 is established. The connection between the communication device 100 and the gateway can include an uplink connection 105 and a downlink connection 107. FIGS. 4 through 6 show an example of a display (not shown) of the user interface 102 at the communication device 100 relating to the establishing a connection between communication device 100 and gateway 120. As shown in FIG. 4, the user can provide its user name via a keypad (not shown) of the user interface 102. In this example, the user name is "EEarth." The user can then scroll down to the "Password" portion of the display and enter a password, as shown in FIG. 5. Finally, the user can scroll down further to the portion of the display relating to the address of the gateway 120. As shown in the example of FIG. 6, the user can enter a Universal Resource Locator (URL) address associated with gateway 120 via the keypad of the user interface 102.

At step 305, encryption is negotiated between the communication device 100 and the gateway 120. Such encryption negotiation can be based on any appropriate encryption scheme such as the private key encryption or public key encryption, for example the Public Key Infrastructure (PKI). At step 307, the user of the communication device 100 is authenticated by gateway 120 through, for example a process that verifies a previous service enrollment.

At step 310, a download request is sent from the communication device 100 to the gateway 120 based on information in the application data store 225 of memory device 200 of the communication device 100. The download request can identify, for example, application-related information sought to be downloaded to the communication device 100. The application-related information can include, for example, applications, application components or application data used by an application. At step 315, application-related information is received at the communication device 100 based on the download request.

Steps 310 and 315 relate to the activation process, by which a user first activates the communication device 100 and provisions, for example, basic applications relating to the initial operation of the communication device. Consequently, in certain circumstances, steps 310 and 315 need not be performed in conjunction with the remaining steps of the flowchart shown in FIGS. 3a and 3b. FIG. 7 shows an example of a display of the user interface 102 of the communication device 100 where the no applications are provisioned for the communication device 100. Such a situation can exist, for example, when the user first enrolls in a service through which the applications are provided.

At step 320, an application indicator is provided to the user based on an application definition stored in the memory device 104 of the communication device 100. The application indicator can be, for example, a glyph that is displayed on the user interface 102 of the communication device 100 and represents an application available for operation on the communication device 100. FIG. 8 shows an example of user interface 104 of communication device 100 where two application indicators are displayed. Similarly, FIGS. 9 and 10 show an example of user interface 104 of communication device 100 where a subset of five application indicators is displayed. More specifically, FIG. 9 shows the display of three of the five application indicators with a scroll bar in a top position; FIG. 10 shows the display of the remaining two of the five application indicators with the scroll bar in a bottom position.

At step 325, an application-related request is received at the communication device 100 from the user. The application-related request can be received, for example, through a numeric keypad (not shown) of the user interface 102. The application-related request can be in response to the display of an application indicator as discussed above in connection with step 320.

At step 330, a download request is sent from the communication device 100 to the gateway 120. The download request will be sent from the communication device 100, for example, when the application-related information associated with the application-related request is not available within the memory device 104 of the communication device 100. In such a situation, the application-related information can be requested through the download request sent to the gateway 120. If the application-related information is available at the memory device 104 of the communication device 100, then the application-related information can be accessed to execute the application and the remaining portion of the flowchart shown by FIGS. 3a and 3b need not be performed.

At step 335, the download request sent from communication device 100 is received at the gateway 120. At step 340, an information request is sent from the gateway 120 to an appropriate destination such as, for example, network service A 140, network service B 150 or network service C 160. The information request can be sent in response to receiving the download request. For example, upon receiving the download request at gateway 120, gateway 120 can determine a destination within network 130 at which the application-related information associated with the download request is located. Based on that network destination and the application-related information being requested, gateway 120 can formulate and send the information request. At step 340, the information request is sent to, for example, network service A 140, network service B 150 or network service C 160. At step 345, the application-related information associated with the information request is received at gateway 120.

At step 350, a determination is made as to whether the available space on the memory device 104 of the communication device 100 is sufficient to store the application-related information associated with the download request. At conditional step 355, if the available space on the memory device 104 of the communication device 100 is insufficient to store the application-related information associated with the download request, then the process proceeds to step 360. At step 360, resource management is performed so that the amount of available memory space is increased. For example, resource management can be performed according to the methods described in co-pending U.S. patent application Ser. No. 10/224,331, entitled "Method and Apparatus for Managing Resources Stored on a Communication Device." Upon completing the resource management process of step 360, the process proceeds to step 350.

Returning to conditional step 355, if the available space on the memory device 104 of the communication device 100 is sufficient to store the application-related information associated with the download request, then the process proceeds to step 365. At step 365, the application-related information associated with the download request is sent from the gateway 120 to the communication device 100. At step 370, the application-related information associated with the download request is received at the communication device 100.

At step 375, the application associated with the application-related information is automatically executed. The application associated with the application-related information is automatically executed in the sense that the portion of the application, to which application-related information is related, can be executed. For example, where the application-related information is application data (e.g., contact or calendar information), the application can make such application data available to the user within the application being executed.

For another example, where the application-related information is an application component, the application component can be displayed or executed depending upon the purpose of the application component. For example, FIGS. 11 and 12 show examples of a user interface display after application components have been received and provisioned. More specifically, the application components here include a screen component, a command component, a command listener and a menu component; after provisioning these components, the display shown in FIG. 11 is provided. Upon receiving an indication from the user relating to the application, the menu component of this application can be displayed as shown in FIG. 12.

Step 375 can be performed with a connected application or a disconnected application. A connected application can receive the application-related information and use that information while communication device 100 maintains a connection with gateway 120. A disconnected application can receive the application-related information while connection between communication device 100 and gateway 120 is maintained, and then use that information after the connection between the communication device 100 and the gateway 120 has been disconnected. In sum, the application can perform operations using the received application-related information regardless of whether the connection between communication device 100 and gateway 120 is maintained after the application-related information is received.

Figure 13:
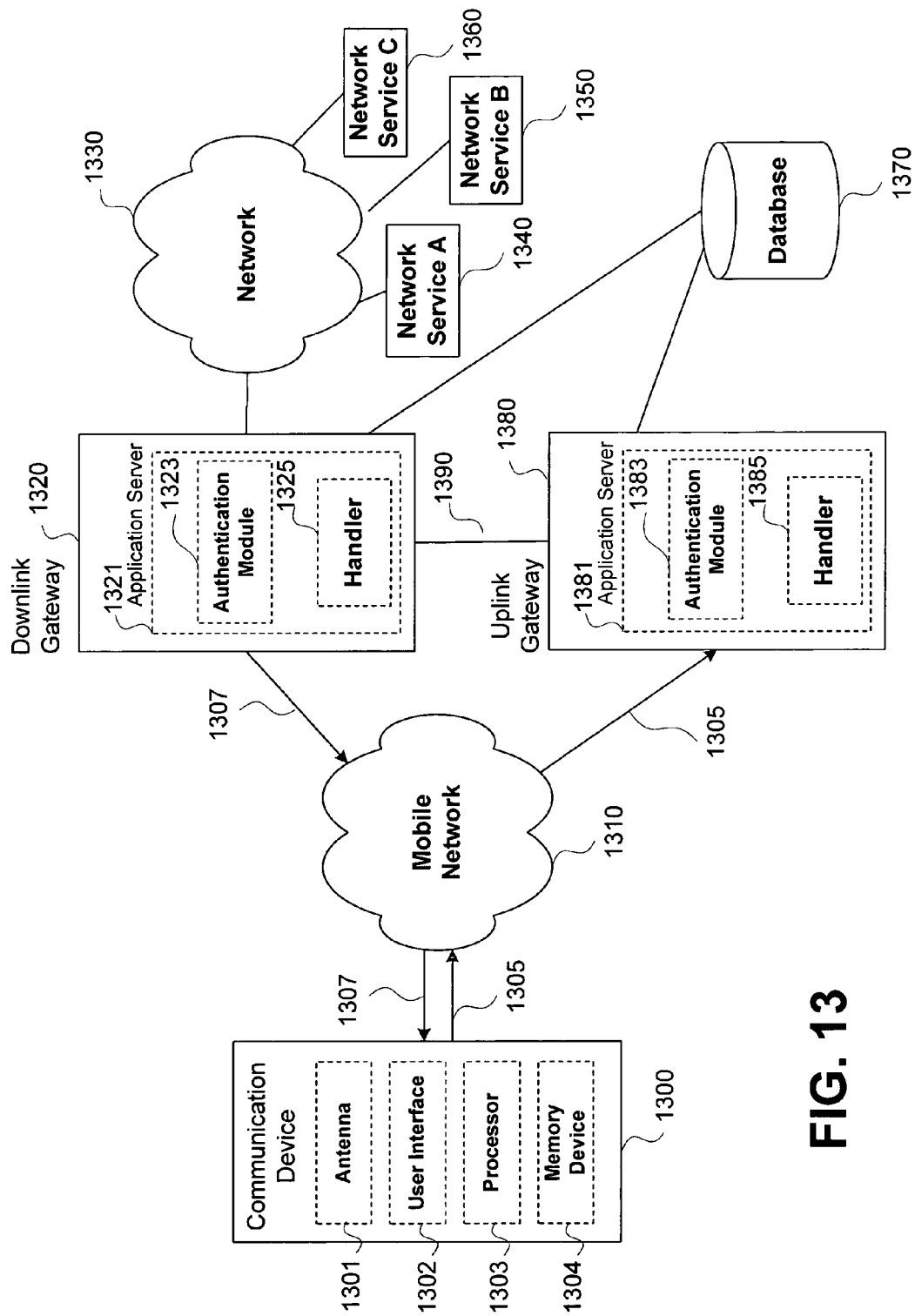
FIG. 13 shows a system block diagram of a communication network including distributed gateways, according to another embodiment of the invention.

FIG. 13 shows a system block diagram of a communication network including distributed gateways, according to another embodiment of the invention. Communication device 1300 includes antenna 1301, user interface 1302, processor 1303 and memory device 1304. Communication device 1300 is coupled to uplink gateway 1380 through mobile network 1310 by an uplink connection 1305, and to downlink gateway 1320 through mobile network 1310 by a downlink connection 1307. Gateways 1320 and 1380 are connected to each other by connection 1390. Gateways 1320 and 1380 are also separately connected to database 1370. In addition, gateway 1320 is coupled to network 1330. Network 1330 is coupled to network service A 1340, network service B 1350 and network service C 1360. Gateway 1320 includes application server 1321, which includes authentication module 1323 and handler 1325. Gateway 1380 includes application server 1381, which includes authentication module 1383 and handler 1385. Although not explicitly shown in FIG. 13, handlers 1325 and 1385 each further include a device resource database, data pagination module and request handling module as discussed in reference to FIG. 1.

Application servers 1321 and 1381 each include software configured to allow the functionality discussed above, including the functionality relating to the authentication modules 1323 and 1383, and handlers 1325 and 1385, respectively. Similarly, communication device 1300 includes client-side software that is configured to operate with the software of application servers 1321 and 1381. Note that although the software is described in terms of client and server software, any appropriate software configuration, such as distributed software, is possible. The uplink connection 1305 and downlink connection 1307 are established for a particular communication device 1300 for the duration of a session, as described in co-pending U.S. patent application Ser. No. 10/224,331, entitled "Method and Apparatus for Establishing Multiple Bandwidth-Limited Connections for a Communication Device."

In a distributed configuration, applications can be provisioned. As shown in FIG. 13, communication device 1300 can send a download request to uplink gateway 1320 via uplink connection 1305 while communication device 1300 is connected to the uplink gateway 1320. Uplink gateway 1320 can then forward the download request to the downlink gateway 1320 via connection 1390. Downlink gateway 1320 can produce an information request based on the download request and forward the information request to the appropriate network destination (e.g., network service A 1340, network service B 1350 or network service C 1360). Upon receiving the application-related information based on the information request, the downlink gateway 1320 can forward the application-related information to communication device 100 via downlink connection 1307.

Although FIG. 13 shows a communication network with two distributed gateways, other configurations of distributed gateways are possible. For example, in embodiments where a communication device is associated with multiple downlink connections, these downlink connections can be distributed across multiple downlink gateways. For a specific example, where a communication device is associated with three downlink connections and three distributed downlink gateways, these three connections each can be uniquely associated with one of the three downlink gateways (each downlink connection being uniquely associated with one downlink gateway). Where a communication device is associated with three downlink connections and two distributed downlink gateways, two downlink connections can be associated with one downlink gateway and the remaining downlink connection can be associated with the remaining downlink gateway.

Similar to the above-described embodiments with multiple downlink connections and distributed downlink gateways, embodiments with multiple uplink connections and distributed uplink gateways are also possible. Alternatively, embodiments with both multiple downlink connections, and distributed downlink gateways, and multiple uplink connections and distributed uplink gateways are also possible.

CONCLUSION

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents.

The previous description of the embodiments is provided to enable any person skilled in the art to make or use the invention. While the invention has been particularly shown and described with reference to embodiments thereof, it will be understood by those skilled in the art that various changes in form and details may be made therein without departing from the spirit and scope of the invention.

What is claimed is:

1. A method for provisioning software applications at a communication device having its own memory device, comprising:
   sending a download request based on an application-related request if a first application component and a second application component associated with the application-related request are not stored on the memory device of the communication device;
   receiving the first application component and the second application component based on the download request;
   storing the first application component after the receiving, the first application component and the second application component being different from an entire amount of an application associated with the first application component and the second application component; and
   executing the application based on the first application component and the second application component, the second application component being irretrievable at the communication device after the executing.

2. The method of claim 1, wherein the receiving is based on the available space of the memory device being at a first time, the method further comprising:
   receiving a third application component based on the download request and an available space of the memory at a second time; and
   executing the third application component.

3. The method of claim 2, further comprising:
   removing information from the memory device after the receiving, the available space of the memory device at the second time being associated with an amount of the information removed from the memory device.

4. The method of claim 1, further comprising:
   providing an application indicator based on an application definition stored on the memory device of the communication device; and
   receiving an application-related request at the communication device from a user, the application-related request being associated with the application indicator.

5. The method of claim 4, wherein:
   the application indicator is associated with a disconnected application,
   the application-related request is received over a connection,
   the disconnected application being operable with the first application component and second application component application component regardless of whether the connection is maintained.

6. The method of claim 1, wherein: the download request is automatically sent if the first application component and the second application component are not stored on the memory device of the communication device.

7. The method of claim 1, further comprising:
   sending an available-memory indicator based on an available space on the memory device of the communication device,
   the receiving step being performed after the available space on the memory device of the communication device is more than a threshold plus a size of the first application component and second application component.

8. The method of claim 1, wherein:
   the download request is sent and the first application component and second application component are received over a wireless connection,
   the communication device being a wireless communication device.

9. The method of claim 1, wherein:
   the second application component includes a screen command;
   the method further comprising displaying information at the communication device based on the second application component.

10. A method for provisioning software applications at a communication device having its own memory device, comprising:
    receiving a download request including an application-related request when information associated with the application-related request is not stored on the memory device of the communication device, the application-related request being associated with an application definition stored in the memory device of the communication device; and
    sending a first application component and a second application component associated with the application-related request based on the download request, the first application component and the second application component being different from an entire amount of an application associated with the first application component and second application component,
    the first application component being configured to be stored at the communication device, the second application component being configured to be immediately executable and subsequently irretrievable after execution.

11. The method of claim 10, wherein the sending is based on the available space of the memory device being at a first time, the method further comprising:
    sending a third application component associated with the application-related request based on the download request and an available space of the memory device at a second time, the third application component being different from the entire amount of the application.

12. The method of claim 10, further comprising:
    sending an available-memory request to the communication device; and
    receiving an available-memory indicator from the communication device, the available-memory indicator being based on the available space on the memory device of the communication device, the sending being performed after the available space on the memory device of the communication device is increased to more than a threshold plus a size of the first application component and second application component.

13. The method of claim 10, wherein:
the first application component is automatically executed at the communication device upon being received at the communication device,
the download request being automatically sent if the first application component is not stored on the memory device of the communication device.

14. The method of claim 10, wherein:
the first application component is associated with a disconnected application,
the first application component is sent over a connection,
the disconnected application being operable with the first application component regardless of whether the connection is maintained.

15. The method of claim 10, wherein:
the download request is received and the first application component and the second application component are sent over a wireless connection,
the communication device being a wireless communication device.

16. The method of claim 10, wherein:
the second application component includes a screen command; and
the second application component configured to display information at the communication device upon execution.

17. A communication device, comprising:
a processor;
a user interface coupled to the processor, the user interface being configured to provide an application indicator based on an application definition and to receive an application-related request associated with the application indicator;
a memory device coupled to the processor, the memory device configured to store an application definition, the memory being configured to store instructions that, when executed by the processor, cause the processor to:
send a download request based on the application request if a first application component and a second application component associated with the application-related request are not stored on the memory device;
receive the first application component and the second application component based on the download request;
store the first application component after the receive; and
execute an application based on the first application component and the second application component, the second application component being unretrievable at the communication device after the execute, the first application component and the second application component being different from an entire amount of an application associated with the first application component and the second application component.

18. The communication device of claim 17, wherein:
the receive is based on the available space of the memory device being at a first time,
the memory device is configured to store further instructions that, when executed by the processor, cause the processor to:
receive a third application component based on the download request and an available space of the memory device at a second time; and
execute the third application component, the third application component being different from the entire amount of the application.

19. The communication device of claim 18, wherein:
the memory device is configured to store a further instruction that, when executed by the processor, causes the processor to remove information from the memory device after receiving the first application component and the second application component, the available space of the memory device at the second time being associated with an amount of the information removed from the memory device.

20. The communication device of claim 17, wherein:
the memory device is configured to store a further instruction that, when executed by the processor, causes the processor to
send the download request automatically if the first application component and the second application component are not stored on the memory device.

21. The communication device of claim 17, wherein:
the memory device is configured to store further instructions that, when executed by the processor, cause the processor to send an available-memory indicator based on the available space on the memory device,
the instruction to receive being performed after the memory device is less than a threshold plus a size of the first application component and the second application component.

22. The communication device of claim 17, wherein:
the first application component is associated with a disconnected application,
the first application component is received over a connection,
the disconnected application being operable with the first application component regardless of whether the connection is maintained.

23. The communication device of claim 17, further comprising:
an antenna coupled to the processor, the antenna being configured to establish a wireless connection, the download request being sent and the information associated with the application-related request being received over the wireless connection,
the communication device being a wireless communication device.

24. A processor-readable memory device storing code representing instructions to cause a processor to perform a process, the code comprising code to:
receive a download request including an application-related request when information associated with the application-related request is not stored on a memory device of a communication device, the application-related request being associated with an application definition stored in the memory device of the communication device; and
send a first application component and a second application component associated with the application-related request based on the download request, the first application component and the second application component being different from an entire amount of an application associated with the first application component and second application component,
the first application component being configured to be stored at the communication device, the second application component being configured to be immediately executable and subsequently irretrievable after execution.

25. The processor-readable memory device of claim 24, wherein the code further includes code to:
send an available-memory request to the communication device; and
receive an available-memory indicator from the communication device, the available-memory indicator being based on an available space on the memory device of the communication device,
the first application component and the second application component being configured to be sent after the available space on the memory device is increased to more than a threshold plus a size of the first application component and second application component.

26. The processor-readable memory device of claim 24, wherein:
the first application component is configured to be automatically executed upon being receiving at the communication device.

27. The processor-readable memory device of claim 24, wherein:
the first application component is associated with a disconnected application,
the first application component is sent over a connection,
the disconnected application being operable with first application component regardless of whether the connection is maintained.

28. The processor-readable memory device of claim 24, wherein:
the first application component is sent over a wireless connection, and
the communication device being a wireless communication device.

29. A method for provisioning software applications at a communication device having its own memory device, comprising:
sending a download request over a bandwidth-limited connection, the download request being associated with application-related information not stored on the memory device of the communication device;
receiving a first portion of the application-related information based on the download request at a first time, the first portion of the application-related information being different from an entire amount of the application associated with the download request;
executing the application based on the first portion of the application-related information after receiving the first portion of the application-related information;
receiving a second portion of the application-related information at a second time, the second portion of the application-related information being different from the entire amount of the application associated with the download request; and
executing the application based on the second portion of the application-related information without storing the second portion of the application-related information in non-volatile memory.

30. The method of claim 29, further comprising:
storing the first portion of the application-related information after the receiving;
automatically executing the first portion of the application-related information after the storing; and
automatically executing the second portion of the application-related information after receiving the second portion of the application-related information.

31. The method of claim 29, further comprising:
providing an application indicator based on an application definition stored on the memory device of the communication device; and
receiving an application-related request at the communication device from a user, the application-related request being associated with the application indicator,
the application indicator being associated with a disconnected application,
information associated with the application-related request being received over the bandwidth-limited connection,
the disconnected application being operable with the first portion of the application-related information regardless of whether the bandwidth-limited is maintained after receiving the first portion of the application-related information.

32. The method of claim 29, further comprising:
removing information from the memory device after receiving the first portion of the application-related information, an available space of the memory device at the second time being associated with an amount of the information from the memory device.

33. A method, comprising:
sending an available-memory request to the communication device;
receiving an available-memory indicator from the communication device, the available-memory indicator being based on the available space on the memory device of the communication device; and
sending a first application component and a second application component associated with an application-related request, the first application component and the second application component being different from an entire amount of an application associated with the first application component and the second application component,
the sending being performed after the available space on the memory device of the communication device is increased to more than a threshold plus a size of the first application component and second application component,
the first application component being configured to be stored in non-volatile memory at the communication device, the second application component being configured to be stored in volatile memory at the communication device.

* * * * *